ARNE FEROY
INVENTOR.

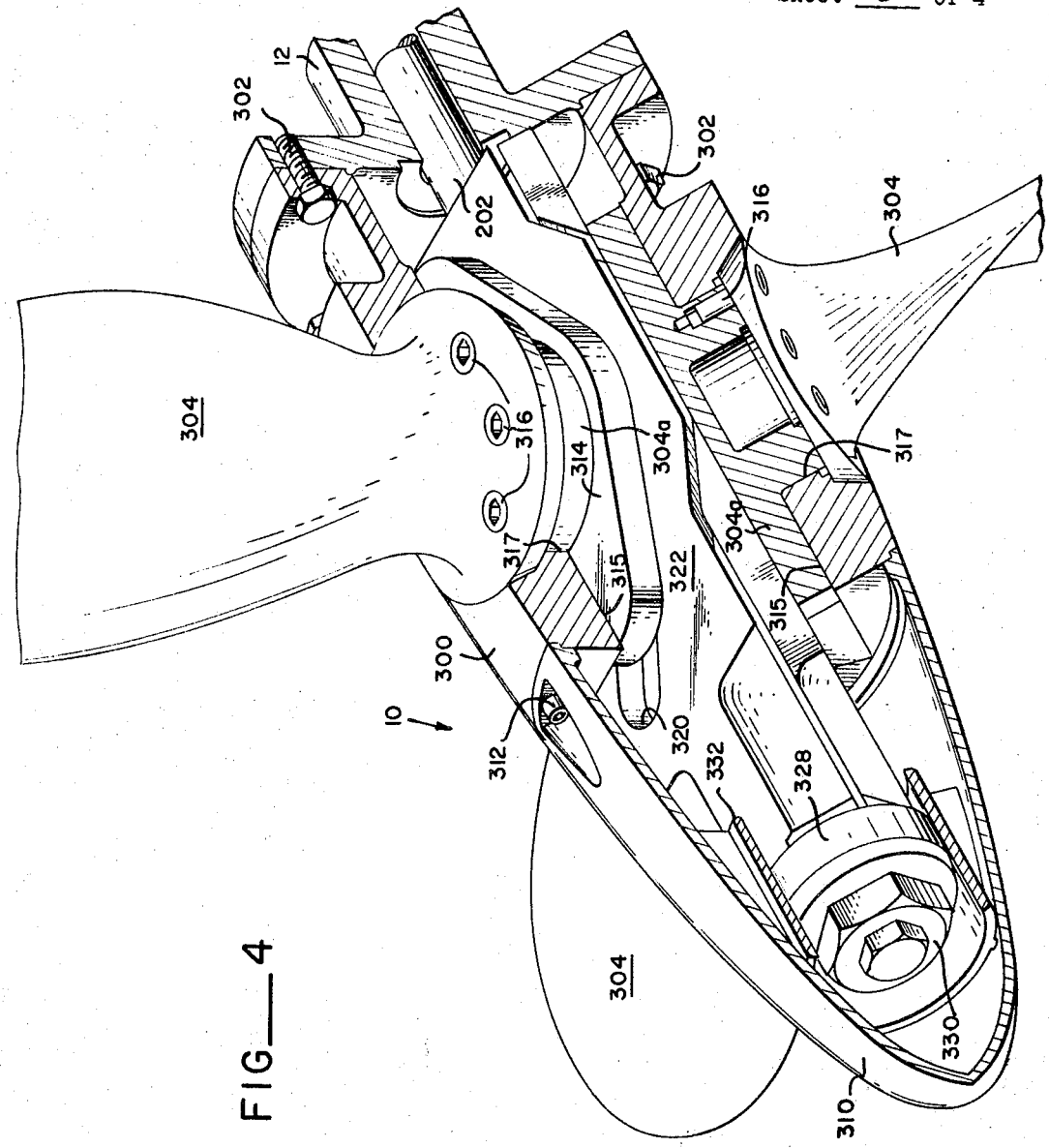
FIG_4

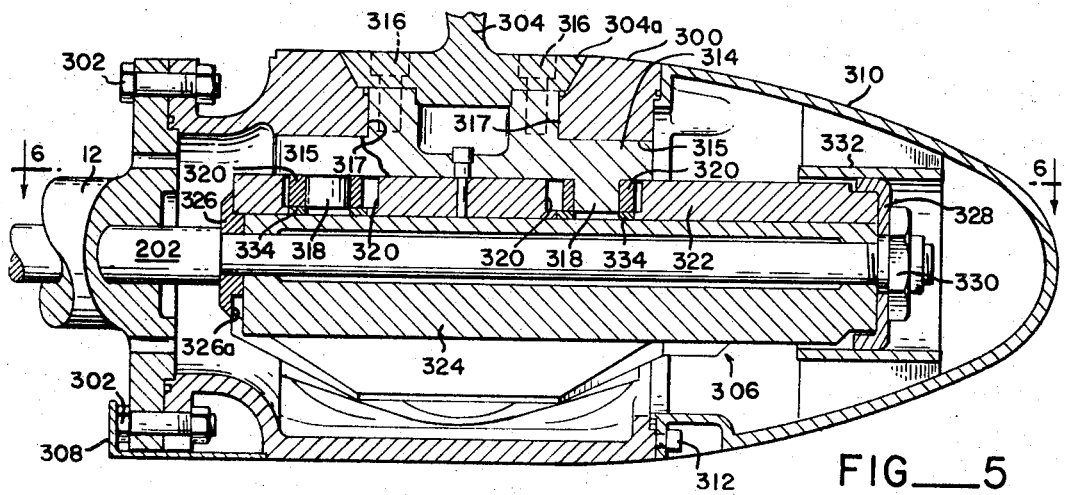
FIG__5
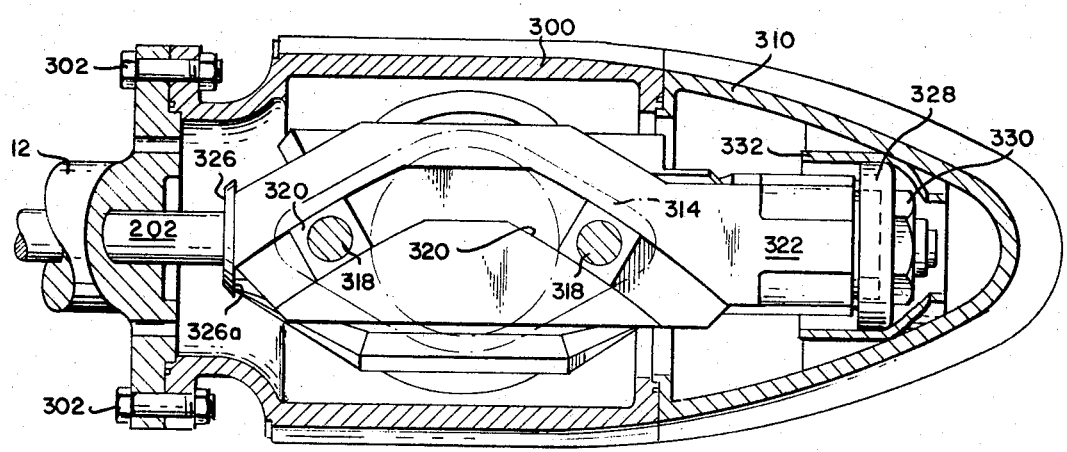
FIG__6
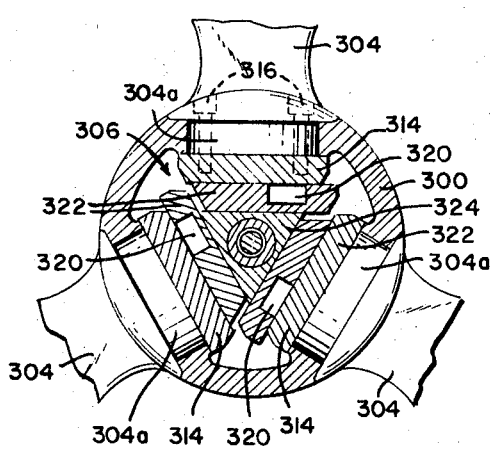
FIG__7
ARNE FEROY
INVENTOR.
BY
ATTORNEYS United States Patent Office 3,437,150
Patented Apr. 8, 1969

3,437,150
VARIABLE PITCH PROPELLER SYSTEM
Arne Feroy, 20017 42nd S., Kent, Wash. 98031
Filed May 31, 1966, Ser. No. 553,877
Int. Cl. B64c 11/06, 11/38; F15b 9/03
U.S. Cl. 170—160.32                                       9 Claims

ABSTRACT OF THE DISCLOSURE

A hydraulically actuatable variable pitch propeller system is provided with an internal locking valve control mechanism which permits relieving a rotary seal from high pressure hydraulic fluid when propeller blade pitch is not being adjusted. The variable pitch propeller system also is provided with a propeller blade cam plate restrained at one end and free to move laterally at the opposite end which is constructed in a manner to facilitate assembly of the variable pitch propeller hub.

---

This invention relates to variable pitch propeller systems for marine use, and more particularly to means for controlling propeller blade pitch in such systems.

In general, a variable pitch propeller system comprises a power plant, a variable pitch propeller assembly, a rotatable drive shaft assembly interconnecting the power plant to the propeller, and an hydraulic control mechanism for varying propeller pitch from a neutral position to full ahead, full astern, or to any position in between. The propeller blades are mounted in an axially-rotatable propeller hub in a manner such that they may be turned about axis perpendicular to the drive shaft for pitch adjustment. Pitch adjustment is effected by axially shifting a cam plate which is mounted within the propeller hub and operably connected to the propeller blades. The propeller pitch hydraulic control mechanism comprises a piston and piston rod assembly operably connected to the cam plate and axially movable in response to pressurized hydraulic fluid exerted on the piston.

The piston and piston rod assembly is mounted within the rotatable components of the propeller assembly, the drive shaft assembly, or both. Hence, hydraulic fluid must be introduced from a fluid supply outside of the rotating system components through a rotary seal to the piston and piston rod assembly. The hydraulic fluid pressure employed in variable pitch propeller systems is relatively high, usually at least about 300 p.s.i. or greater, and hence the rotary seal is a source of constant fluid leakage whenever it is exposed to the hydraulic fluid pressure. In known variable pitch propeller systems, the rotary seal is continually exposed to high pressure fluid, both when adjusting propeller blade pitch and when the propeller blades are simply being maintained at a desired pitch. Consequently, a bulky housing must be employed to enclose the rotary seal to collect the fluid leakage. Also, the constant exposure to high pressure fluid results in high seal costs and maintenance problems.

A primary object of this invention is to provide a variable pitch propeller system having an hydraulic fluid system that relieves high pressure on the rotary seal when the propeller blade pitch is not being adjusted. Another object is to provide a control mechanism internally of the rotating components of the propeller system for locking the propeller blades in any desired pitch position so that the rotary seal can be relieved of high pressure. A further object is to provide for hydraulic actuation of such an internal control mechanism. Still another object is to provide such an internal control mechanism comprised of a sliding spool valve. A still further object is to provide a hydraulically-controlled variable pitch propeller assembly that is easier to assemble and stronger, and that can be assembled in a smaller hub diameter.

These and other objects and advantages of this invention will become apparent from the following description in conjunction with the accompanying drawings, of which:

FIG. 4 is a perspective view, partially in cross-section, of an exemplary variable pitch propeller assembly further illustrating the application of the invention;

FIG. 5 is a longitudinal cross-section view of the FIG. 4 propeller assembly;

FIG. 6 is a plan view of a blade root flange of the FIG. 4 propeller assembly taken along the line 6—6 of FIG. 5; and FIG. 7 is a lateral cross-section view of the FIG. 4 propeller assembly.

In brief one aspect of the invention comprises a variable pitch propeller system wherein propeller blade pitch is adjustable by means of an internal piston and piston rod assembly and wherein hydraulic actuation of the piston and piston rod assembly is controlled by an internal locking valve control mechanism which permits relieving a rotary seal from high pressure hydraulic fluid when propeller blade pitch is not being adjusted. The invention also comprises external hydraulic control circuitry associated with the internal control mechanism to relieve the rotatable seal from high pressure fluid. The invention also includes a variable pitch propeller assembly wherein a propeller blade cam plate is restrained at one end and free to move laterally at the opposite end to permit turning the propeller blades with low forces on the bearing surfaces without mechanical binding in the mechanism. The cam plates for each propeller blade are constructed in a manner to facilitate their assembly into the propeller hub.

Figure 1:
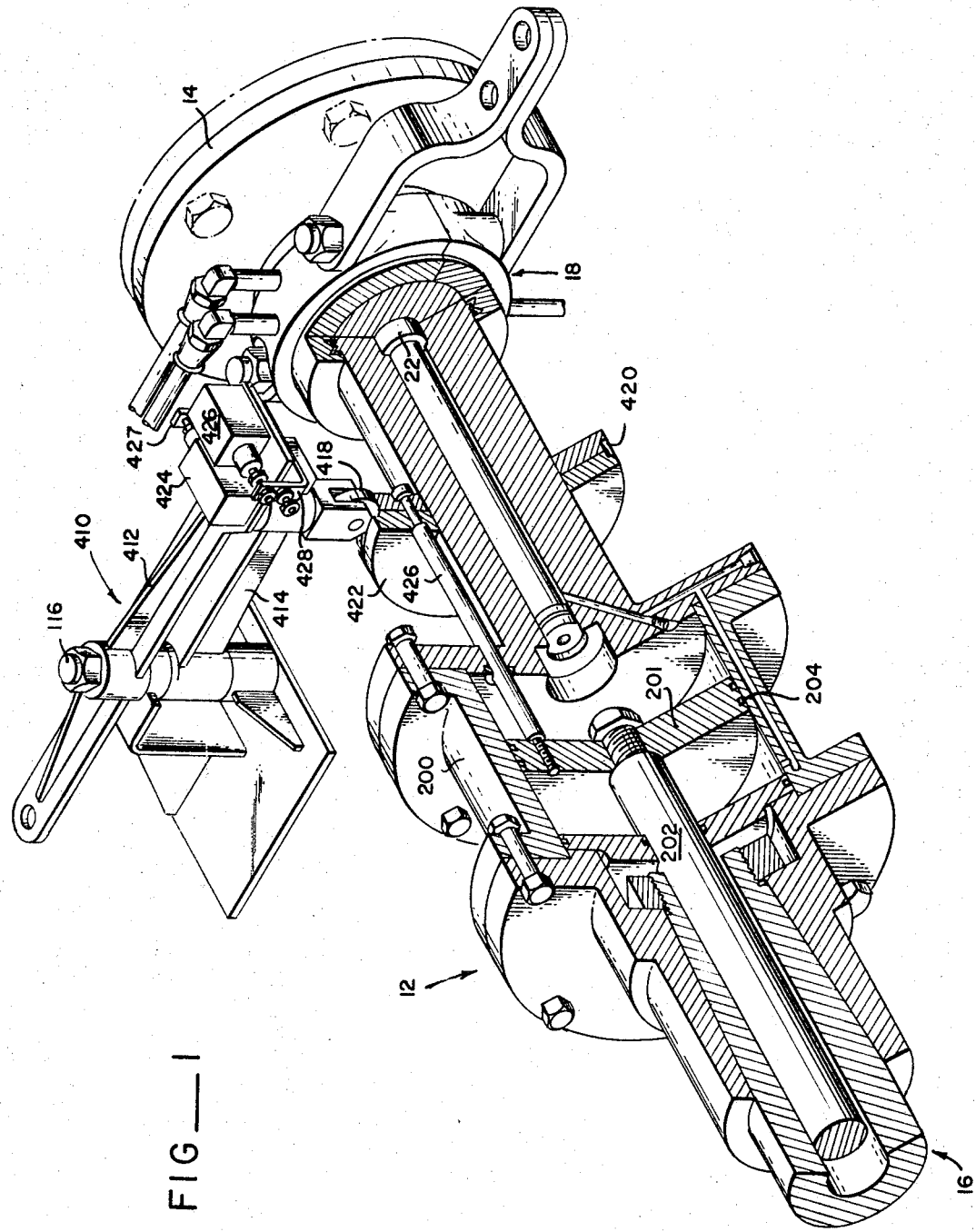
FIG. 1 is a perspective view, partially in cross-section, of an exemplary drive shaft assembly illustrating the application of the invention.

Wth reference to FIGS. 1 and 4, a variable pitch propeller system comprises a propeller assembly 10, a drive shaft assembly 12 connected at one end to the propeller assembly and at the other end to a drive flange 14 for driving connection to a power plant, a hydraulically-actuated piston and piston rod assembly 16 located internally of the system for varying the pitch of the propeller blades, and an hydraulic fluid transfer bushing 18 providing a rotary seal for transferring hydraulic fluid to and from the internally located piston and piston rod assembly.

Figure 2:
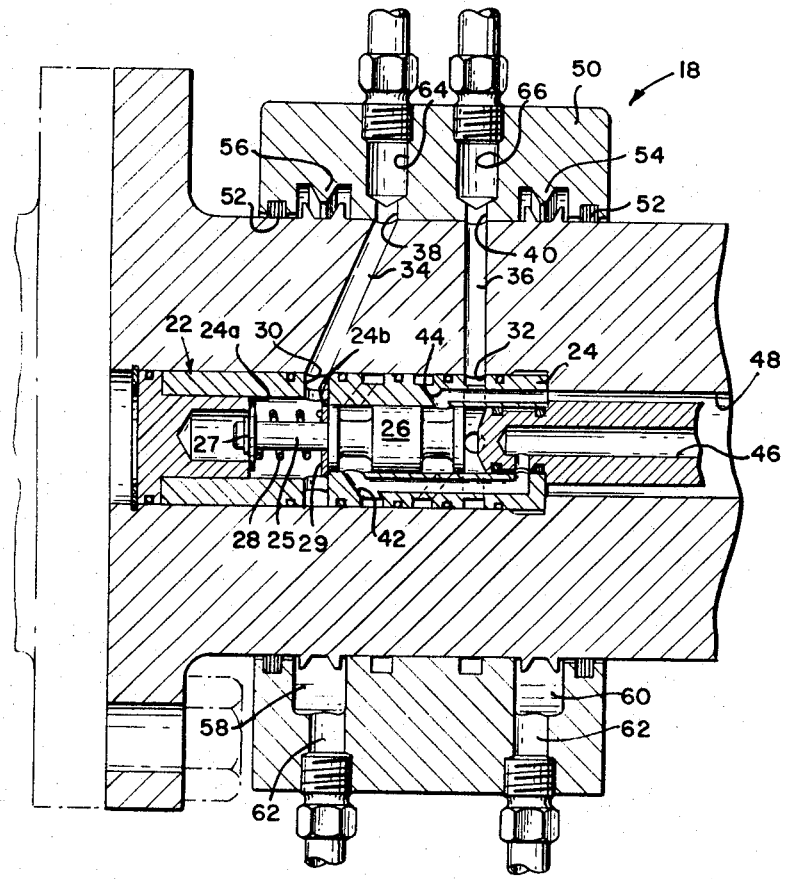
FIG. 2 is a cross-section view of a drive shaft segment illustrating an exemplary internal control mechanism for hydraulically controlling propeller blade pitch.

As shown in FIGS. 1 and 2, an hydraulic fluid control mechanism 22 is located internally of the system to control hydraulic fluid flow to and from the piston and piston rod assembly. This control mechanism, through internal porting in the system, is in fluid communication with hydraulic fluid ports in the transfer bushing and, through internal porting in the system, is in fluid communication with both faces of the hydraulic piston. This control mechanism can be positioned to block the fluid communication between the piston faces and the transfer bushing so as to hydraulically lock the piston and piston rod assembly to maintain a desired propeller blade pitch, and can be positioned to permit such fluid communication so as to shift the piston and piston rod assembly to vary propeller blade pitch.

The embodiment of the control mechanism shown in FIG. 2 is a spring-centered sliding spool lock valve fitted within an axial bore of the drive shaft. The spool valve comprises a valve body 24, a sliding spool 26, and a spring 28 abutting one end of the spool and one end of the valve body. The valve body is provided with two pressure ports 30 and 32 in communication with passages 34 and 36, respectively, in the drive shaft which lead to annular passages 38 and 40 in the transfer bushing. The valve body is also provided with two cylinder ports, 42 and 44 which are in communication with opposite sides of the piston through passages 46 and 48, respectively, provided in the drive shaft. The spool is provided with three lands formed such that the center land always separates the cylinder ports and such that the end lands can alternately separate pressure port 30 from adjacent cylinder port 42 and pressure port 32 from adjacent cylinder port 44 or place the respective adjacent ports in fluid communication. The spring is mounted on a rod 25 by two bushings 27 and 29 which abut edges 24a and 24b of the valve body, respectively. Thus, whether the spool shifts left or right, the spring will be compressed by one bushing or the other.

The pressure ports 30 and 32 are open into the spool chamber on either end of the spool as shown such that the spool is pressure actuated by supply fluid in one direction or the other to expose pressure port 30 to cylinder port 42 and to expose pressure port 32 to cylinder port 44. Thus, the embodiment illustrated is, in effect, pilot operated. When hydraulic fluid flow to the transfer bushing is terminated, the spring will re-center the spool thereby blocking hydraulic fluid flow internally of the system and hydraulically locking the piston and piston rod assembly.

Other porting and spool arrangements for the spool valve could be employed so long as the positive locking feature above described is provided.

Also, the actuation of the locking valve could be by other means such as pneumatic or electric means.

The transfer bushing shown in FIG. 2 comprises a bushing member 50 which rotatably receives the drive shaft and which forms end seals 52—52 and rotary labyrinth seals with the drive shaft at 54 and 56. The bushing member is provided with semi-circular cavities 58 and 60 below the lower portions of the seals to receive fluid leakage which may occur when actuating the piston and piston rod assembly. One or more drain ports 62 are provided in communication with these cavities to return the fluid leakage to the hydraulic fluid supply circuit. The annular passages 38 and 40 communicate with the external hydraulic fluid supply system through hydraulic fluid working lines 64 and 66.

Figure 3:
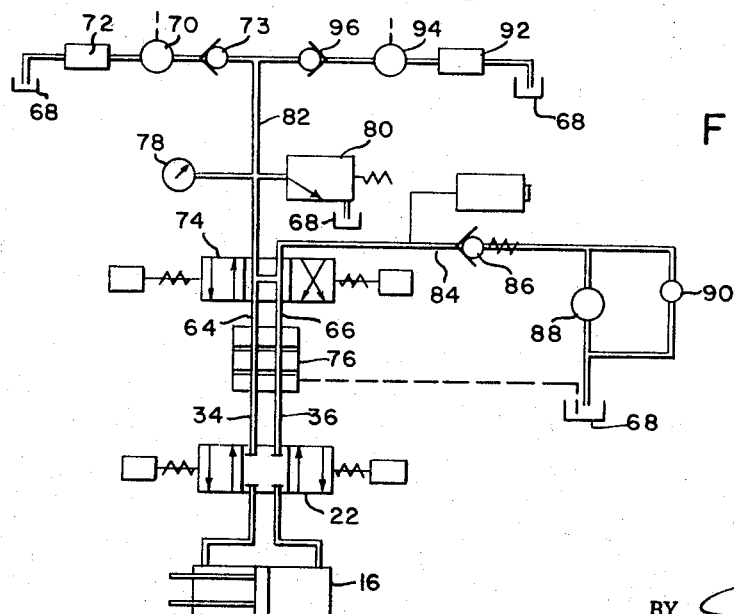
FIG. 3 is a graphical diagram of an exemplary hydraulic circuit for controlling propeller blade pitch.

With reference to FIG. 3, an exemplary hydraulic fluid supply circuit would comprise an hydraulic fluid reservoir 58, and hydraulic pump 70 powered by a ship's main power supply with an inlet connected to supply line 82 via a check valve 73, an open center type four-way directional control valve 74, a rotary seal assembly 76 which includes the transfer bushing 18 of FIGS. 1 and 2, the spool type internal locking valve 22, and the internal piston and piston rod assembly 16. A pressure gage 78 and a relief valve 80 may be connected into the fluid supply line 82 upstream of the control valve 74. The tank return line 84 is provided with a low pressure check valve 86, a filter 88, and a still lower pressure filter bypass check valve 90. The circuit may also be provided with a duplicate hydraulic fluid pumping system such as strainer 92, pump 94 and check valve 96 so that an auxiliary power supply can be employed to vary the propeller blade pitch. The control valve 74 may be actuated by any suitable means such as a servomechanism-controlled solenoid operated by a propeller pitch control in a ship's control station. By setting the pitch control to either a forward or reverse position, the control valve 74 will be actuated to set up the proper pressurized fluid flow to shift the locking valve 22 to permit the propeller blade pitch to vary. When the propeller blade pitch is set to the proper degree, the servomechanism will return the control valve 74 to center position thereby dumping supply fluid to tank and thereby causing locking valve 22 to re-center and lock the propeller blades at the desired degree of pitch. Since the propeller blade pitch will be varied only occasionally, the hydraulic circuit above described will substantially relieve the transfer bushing of high pressure fluid.

FIG. 1 depicts a single piston 201 of the piston and piston rod assembly positioned within a piston chamber provided by an enlarged section 200 of the drive shaft assembly. The piston is connected to the propeller assembly by an elongated piston rod 202 extending axially through the drive shift. The enlarged section 200 has sufficient axial length to permit the piston to shift to any position required to vary the propeller blade pitch from full ahead to full astern. The outer peripheral edge of the piston is fitted with seal members 204 which bear against the inner surface of the enlarged section 200. It should be understood that the positioning of the piston and the piston rod assembly depicted by FIGS. 1 and 4 is not critical inasmuch as this assembly can be positioned wherever it would be convenient to do so. For example, this assembly could be located entirely within the propeller assembly. Furthermore, use of a single piston also is not critical inasmuch as a multiple piston assembly could be employed and operably connected to vary propeller blade pitch.

FIGS. 4–7 depict a propeller assembly of the type shown and descibed in United States Patent No. 2,763,329 issued in the name of A. Feroy. This propeller assembly comprises a hub 300 having a flanged forward end axially coupled to the flanged end of drive shaft 12 by bolts 302, propeller blades 304, and a propeller blade pitch adjusting mechanism 306, actuated by piston rod 202.

The propeller hub has a recessed annulus behind the forward flange providing access to the bolt nuts which is covered by a cover plate 308 as shown in FIG. 5. The propeller hub shown has three radially aligned, equi-spaced openings therein for the propeller blades. The outer portions of the openings are preferably counter sunk as shown. This hub must have sufficient mass to absorb centrifugal and thrust forces imposed on the propeller blades during operation. The rearward portion of the hub is provided with a tail cap 310 to reduce turbulence around the hub. The tail cap is attached to the hub by cap screws 312. The tail cap could alternately be threaded and screwed into corresponding threads in the hub.

Each propeller blade has a blade root 304a designed to set in one of the countersunk hub openings with the outer root surface flush with the outer hub surface. Each propeller blade is attached to a blade root flange 314 by means such as cap screws 316 or by being threadably connected. Each blade root flange bears against undercut surfaces of the hub at 315 so that centrifugal forces acting on the propeller blade are transferred to the hub by the blade root flange. Each blade root flange also extends into the openings in the hub and bears against the side surfaces thereof as at 317 so that thrust forces acting on the propeller blades are transferred to the hub by the blade root flange. Each blade root flange also extends into the openings in the hub and bears against the side surfaces thereof as at 317 so that thrust forces acting on the propeller blades are transferred to the hub by the blade root flange. The propeller blades and blade root flanges interfit as tightly as possible with the hub and yet are free to rotate about an axis normal to the hub axis of rotation for blade pitch adjustment.

Each blade root flange is provided with two radial inwardly-extending cylindrical pins 318—318 which ride in cam slots 320—320. Each pin 318 is fitted within a guide block 320 having side surfaces which closely interfit with the side surfaces of the respective cam slots thereby affording surface bearing contact rather than point bearing contact as would occur between the cylindrical pin and cam track surface. Each set of cam slots is formed in a floating plate 322.

The piston rod 202 extends into the propeller hub and is axially connected to a center spacer block 324. Preferably, the piston rods extend through an axial bore in the center spacer and the center spacer is affixed thereto by a rod collar 326 at the forward end and by a retaining ring 328 and rod nut 330 at the rearward end. The piston rod section extending through the center spacer has a stepped-down diameter and the rod collar 326 abuts the step to fix the location of center spacer.

The center spacer has a triangular cross-section and each of its faces is normal to the radially-aligned axis of one of the propeller blades. The blade root flanges each lay on one of the faces of the center spacer and are held in place thereon by a circumferential extension 326a of rod collar 326 bearing against the forward edges of the flanges and by the retaining ring 328 bearing on the outer rearward surfaces of the flanges as shown in FIGS. 4 and 5. These flange rearward surfaces are curved such that the retaining ring makes good contact therewith in a manner that prevents, or at least essentially prevents, any lateral movement of the flanges at their rearward ends. The restraint of the forward ends of the flanges by rod collar 326 permits these forward ends a small degree of lateral movement, on the order of a few thousandths of an inch. The ability of the blade root flanges to move laterally at one end, but not at the other, permits forming the cam slots 320 identically and positioned only approximately at geometrically conjugate angles with no possibility of jamming since the flanges can adjust their positions to suit the instant positions of the flange pins as the propeller blade pitch is varied.

The use of a retaining ring restraint at the rearward end of the flanges is an improvement over the pin type restraint specifically disclosed in the aforementioned Feroy patent inasmuch as the retaining ring is easier to install, the restraint is stronger, and the center spacer can be made smaller thereby enabling the reduction of the overall diameter of the hub assembly. In addition, the tail cap can be provided with a cylindrical bearing surface 332 against which the retaining ring can slide axially to help stabilize and guide the propeller blade pitch adjusting mechanism.

In propeller assemblies where the actuating piston and piston rod assembly are house within the propeller hub, the retaining ring could also function as a piston by suitable design whereby the ring-like bearing surface is provided to enclose the floating plate end portions.

The propeller assembly shown could be assembled in the following manner. First, the blade root flanges are inserted in the hub openings. The three floating plates are then inserted into the hub and the respective cam slots inserted over the flange pins. Because of the limited working space within the hub, the cam tracks are each counterbored in the underside of the flanges at one point as shown in FIG. 5 to facilitate insertion of the guide blocks onto the flange pins after the flanges have been inserted into the hub. After the guide blocks have been installed filler plates 334 are inserted into each of the counter bores to prevent the guide blocks from pamming in the counterbored openings during operation. The filler plates are thick enough to just occupy the counter bore as shown. The center spacer is inserted between the blade root flanges. With the center spacer in position, the thus far assembled components are solidly in place. The rod collar and center spacer are then slid onto the stepped down piston rod section followed by the retaining ring and rod nut. The tail cap is installed and the forward end of the hub bolted to the drive shaft. The important feature to be noted in the above description of assembly, is the provision of countersunk openings in the cam tracks to facilitate insertion of the guide blocks. Without such provision, assembly would be exceedingly difficult without enlarging the hub diameter and thereby deleteriously reducing the propeller blade area.

FIG. 1 further depicts an exemplary servomechanism motor 410 employed to sense and control the degree of propeller blade pitch. This device comprises upper and lower swing arms 412 and 414, respectively, which are pivotally mounted on pin 116 for rotation about an axis perpendicular to the drive shaft axis of rotation. The lower arm 414 has a rotatable cam follower 418 mounted thereon for travel in cam track 420 of cam 422. The cam follower is also adapted to swivel about an axis parallel to the arm swing axis so that the cam follower can maintain proper alignment as the cam is shifted along the drive shaft. The upper arm 412 mounts a pair of microswitches 424–426 each having a plunger-type actuator adapted to contact a respective bumper 427–428 mounted on the lower arm when either the upper or lower arm is swung in relation to the other.

The cam 422 is slidably mounted on the drive shaft and connected to the piston 201 by connecting rods 426 which extend through the side wall of the enlarged drive shaft section 200 as shown in FIG. 1. As the piston shifts to vary the propeller blade pitch, the cam will also shift the same distance. Thus, by provision of an appropriate servomechanism, setting of the pitch control to any position causes pressure to be applied to the end of the upper swing arm so as to depress one of the microswitch plungers against its respective bumper on the lower swing arm. This actuation of one of the microswitches will actuate the hydraulic four-way control valve to transfer fluid through the appropriate working line to the internal locking valve, thereby shifting the position of the locking valve so as to actuate the piston and piston rod assembly to vary the propeller blade pitch. The cam will shift with the piston thereby swinging the lower swing arm. When the desired pitch degree is reached, pressure against the upper swing arm will cease and the lower swing arm will pivot slightly beyond the upper swing arm until the heretofore actuated microswitch is deactivated by releasing its plunger. Deactivation of the microswitch will cause the four-way control valve to return to center position to shunt fluid from the internal locking valve thereby hydraulically locking the piston and piston rod assembly. If for any reason, such as fluid leakage past the hydraulic seal around the piston periphery, the piston shifts position slightly thereby permitting the propeller blade pitch to vary, one of the limit switch plungers will be depressed by movement of the lower swing arm and the switch actuation will automatically effect the return of the propeller blade pitch to the desired position.

It is believed that the invention will have been clearly understood from the foregoing detailed description of my now preferred illustrated embodiment. Changes in the details of construction may be resorted to without departing from the spirit of the invention and it is accordingly my intention that no limitations be implied and that the hereto annexed claims be given the broadest interpretation to which the employed language fairly admits. For example, the means connecting the floating plates to the center spacer could be applied to the forward end of the floating plates rather than to the rearward, so long as the requirement for restraint at one end is satisfied.

What is claimed is:

1. A variable pitch propeller assembly comprising a propeller hub; blade root flanges within said hub, each connectable to a propeller blade and having inwarldy extending pins; guide blocks fitted around each pin; axially movable floating plates within said hub, each associated with a blade root flange and having a cam track in the outer surface thereof of a depth less than the width of the respective floating plate for guide blocks, and each floating plate cam track being counter bored from the under side of the respective floating plate to provide an opening through the inner surface of the respective floating plate through which a guide block can be inserted into the cam track around the respective pin; a filler plate fitted within said opening after installation of said guide block; a center spacer inserted between said floating plates to radially position said floating plates and axially movable; and means connecting said floating plates to said center spacer whereby one end of each floating plate is restrained against lateral movement and whereby the opposite end of each floating plate is laterally movable.

2. A variable pitch propeller system according to claim 1 wherein the floating plate restraining means comprises a member having a ring-like bearing surface enclosing one end portion of each floating plate to restrain such floating plate ends against lateral movement.

3. A variable pitch propeller assembly comprising axially movable floating plates operably connectable to said propeller blades for turning said propeller blades about axis normal to the propeller assembly axis of rotation; a center spacer inserted between said floating plates to radially position said floating plates and axially movable by said actuating means; and means connecting said floating plates to said center spacer comprising a member having a ring-like bearing surface enclosing one end of each floating plate to restrain such floating plate ends against lateral movement.

4. A variable pitch propeller assembly according to claim 1 wherein each floating plate cam track extends to at least one edge of the effective floating plate.

5. A variable pitch propeller system according to claim 1 including actuating means within said system for hydraulically varying the propeller plate pitch with hydraulic fluid supplied from without said system; and valve means within said system for hydraulically locking said actuating means to permit termination of hydraulic fluid supply to said system when not varying the propeller blade pitch.

6. The system of claim 5 wherein said valve means comprises an hydraulic locking valve.

7. The system of claim 5 including transfer means for transferring hydraulic fluid between said valve means and an external hydraulic fluid supply.

8. The system of claim 5 including control means outside of said system for controlling hydraulic fluid transfer to and from said valve means and including transfer means for transferring hydraulic fluid between said valve means and said control means.

9. The variable pitch propeller system according to claim 1 including a drive shaft assembly for rotating said propeller assembly; actuating means within said system for hydraulically varying propeller blade pitch with hydraulic fluid supplied from without said system; a transfer bushing providing a rotary seal for transferring hydraulic fluid to and from said system; and valve means within said system for hydraulically locking said actuating means to permit termination of hydraulic fluid supply to said transfer bushing when not varying propeller blade pitch.

References Cited

UNITED STATES PATENTS

| 2,355,039 | 8/1944  | Eves    | 170—160.32 |
| 2,717,652 | 9/1955  | Nichols | 170—160.32 |
| 2,763,329 | 9/1956  | Feroy   | 170—160.47 |
| 2,786,539 | 3/1957  | Nichols | 170—160.32 |
| 3,086,595 | 4/1963  | Nichols | 170—160.32 |
| 3,219,121 | 11/1965 | Barden  | 170—160.31 |

FOREIGN PATENTS 768,595   2/1957   Great Britain.

EVERETTE A. POWELL, JR., *Primary Examiner.*

U.S. Cl. X.R.

170—160.47